United States Patent
Barooah et al.

(10) Patent No.: US 9,256,572 B2
(45) Date of Patent: Feb. 9, 2016

(54) MULTI-FABRIC SAN BASED DATA MIGRATION

(71) Applicant: Cisco Technology Inc., San Jose, CA (US)

(72) Inventors: Manas Barooah, Cupertino, CA (US); Rahul Chari, Kodihali (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/556,066

(22) Filed: Nov. 28, 2014

(65) Prior Publication Data

US 2015/0089012 A1 Mar. 26, 2015

Related U.S. Application Data

(63) Continuation of application No. 12/166,263, filed on Jul. 1, 2008, now Pat. No. 8,914,540.

(51) Int. Cl.
*G06F 15/173* (2006.01)
*H04L 29/08* (2006.01)
*G06F 3/06* (2006.01)

(52) U.S. Cl.
CPC .......... *G06F 15/17331* (2013.01); *G06F 3/067* (2013.01); *G06F 3/0607* (2013.01); *G06F 3/0613* (2013.01); *G06F 3/0647* (2013.01); *H04L 29/08549* (2013.01); *H04L 67/1097* (2013.01)

(58) Field of Classification Search
CPC ................................................. H04L 29/08549
See application file for complete search history.

(56) References Cited

U.S. PATENT DOCUMENTS

| 7,506,124 B2 * | 3/2009 | Sharma | H04L 63/00 370/392 |
| 8,239,477 B2 * | 8/2012 | Sharma | G06F 3/0605 707/659 |

\* cited by examiner

*Primary Examiner* — Jimmy H Tran

(57) ABSTRACT

In one embodiment, a network device in a network obtains information identifying first storage and second storage. The network device notifies one or more other network devices in the network that traffic that is received by the other network devices is to be routed to the network device. The network device performs data migration from the first storage to the second storage. When the data migration from the first storage to the second storage is completed, the network device notifies the other network devices in the network that traffic that is received by the other network devices is no longer to be routed to the network device.

20 Claims, 8 Drawing Sheets

MULTI-FABRIC SAN BASED DATA MIGRATION

RELATED APPLICATIONS

This application is a continuation of U.S. patent application Ser. No. 12/166,263, entitled "Multi-Fabric SAN Based Data Migration," filed on Jul. 1, 2008, which is wholly incorporated by reference herein.

TECHNICAL FIELD

The present disclosure relates generally to methods and apparatus for performing data migration.

DESCRIPTION OF THE RELATED ART

Data migration generally refers to the moving of data from its existing storage to another storage. More specifically, data migration is often performed when existing storage is replaced, upgraded, or consolidated.

Existing data migration methods can be complex, as well as disruptive to the flow of traffic. Some data migration methods require the re-wiring and reconfiguration of the network infrastructure. Configuration changes to devices in the network typically require coordination between different groups within the organization, making scheduling of data migration difficult. Other data migration methods require the rebooting of devices in the network prior to data migration. As a result, the flow of traffic in the network could be disrupted.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well-known process steps have not been described in detail in order not to unnecessarily obscure the disclosed embodiments.

Overview

In one embodiment, a network device in a network obtains information identifying first storage and second storage. The network device notifies one or more other network devices in the network that traffic that is received by the other network devices is to be routed to the network device. The network device performs data migration from the first storage to the second storage. When the data migration from the first storage to the second storage is completed, the network device notifies the other network devices in the network that traffic that is received by the other network devices is no longer to be routed to the network device.

Specific Example Embodiments

The disclosed embodiments support data migration from a first storage (e.g., existing storage) to a second storage (e.g., new storage). This is accomplished without performing modifications to the existing storage or a host (e.g., server) capable of accessing the storage. Moreover, the disclosed embodiments may be performed without inserting a network appliance in the path between the server and the existing storage. Rather, the disclosed embodiments may be performed via an existing node in the network. More specifically, the disclosed embodiments may be implemented at one or more internal nodes (e.g., routers or switches) of a network, as will be described in further detail below. These internal nodes may be referred to as "intelligent nodes" or "data migration nodes."

Figure 1:
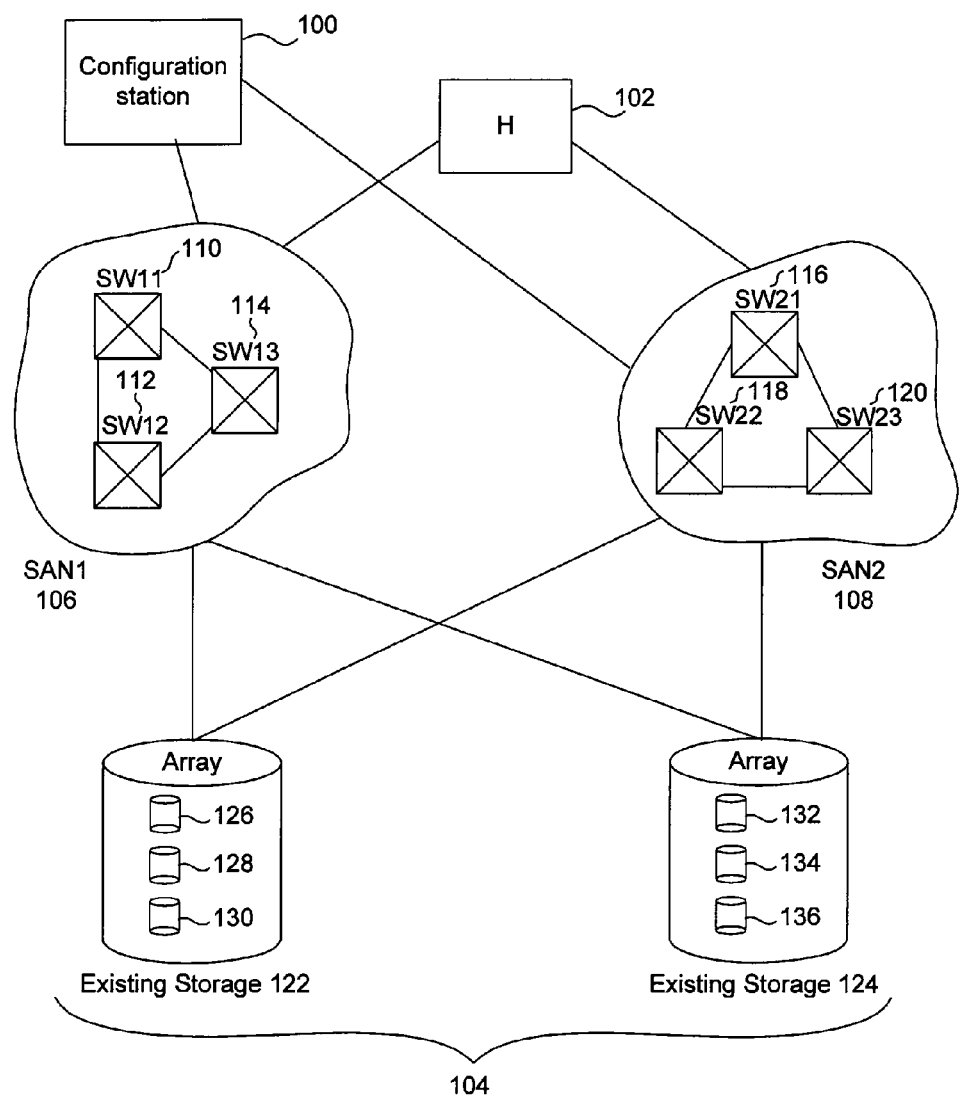
FIG. 1 is a block diagram illustrating an example network in which the disclosed embodiments may be implemented.

FIG. 1 is a block diagram illustrating an example network in which the disclosed embodiments may be implemented. The network may be a storage area network (SAN) supported by a protocol such as Fibre Channel. As shown, the network may support communication between a host 102 and storage 104 across one or more fabrics (i.e., networks). In this example, the network includes a first SAN 106 shown as SAN1 and a second SAN 108 shown as SAN2. Through implementation of the disclosed embodiments, connectivity between the host 102 and the storage 104 may be maintained by preserving all paths to the storage 104 including paths across physically separate fabrics, SAN1 106 and SAN2 108. This may be accomplished by selecting a node in each of the fabrics to be responsible for managing data migration.

As shown in FIG. 1, the first SAN 106, SAN1, includes three switches, SW11 110, SW12 112, and SW13 114. Similarly, the second SAN 108, SAN2, includes three switches, SW21 116, SW22 118, and SW33 120. In this example, an administrator selects SW13 114 in SAN1 106 and SW23 120 in SAN2 108 to be responsible for data migration via configuration station 100. In other words, a set of data migration nodes may include at least one node in each fabric. Each node in the set of data migration nodes may be referred to as an "intelligent node."

The data migration nodes may notify other internal nodes (e.g., switches or routers) that traffic that is received is to be rerouted via one of the data migration nodes. More specifically, a data migration node in one fabric may notify other internal nodes in the same fabric that traffic is to be rerouted via the data migration node in that fabric.

Data migration may include copying data from a first set of storage devices (i.e., existing storage) 122 to a second set of storage devices (i.e., new storage) 124. As shown in this example, the first set of storage devices 122 (i.e., first storage) may include one or more storage devices 126, 128, 130 and the second set of storage devices 124 (i.e., second storage) may include one or more storage devices 132, 134, 136. For instance, a set of storage devices may be a storage array including one or more disks. In a Fibre Channel network using the Small Computer Systems Interface (SCSI) protocol, the storage devices in a set of storage devices may be referred to as logical units (LUNs).

The disclosed embodiments may be performed without implementing virtualization of storage. Thus, the first set of storage devices 122 and the second set of storage devices 124 may maintain a mapping of those storage devices to which the host 102 has access. In accordance with one embodiment, one or more of the data migration nodes may perform data migration using the identity of the host 102 in order to access the same storage devices to which the host 102 has access. Where one of the data migration nodes performs data migration from the first set of storage devices 122 to the second set of storage devices 124, the data migration node may update the other data migration nodes of the status of the data migration, as will be described in further detail below.

When other nodes receive a command such as a read or write command, the nodes may reroute such a command to one of the data migration nodes. Since the read and write commands are routed via one of the data migration nodes, the data migration nodes may manage the manner in which the read and write commands are processed during data migration, as will be described in further detail below with reference to FIG. 6.

Figures 2A, 2B:
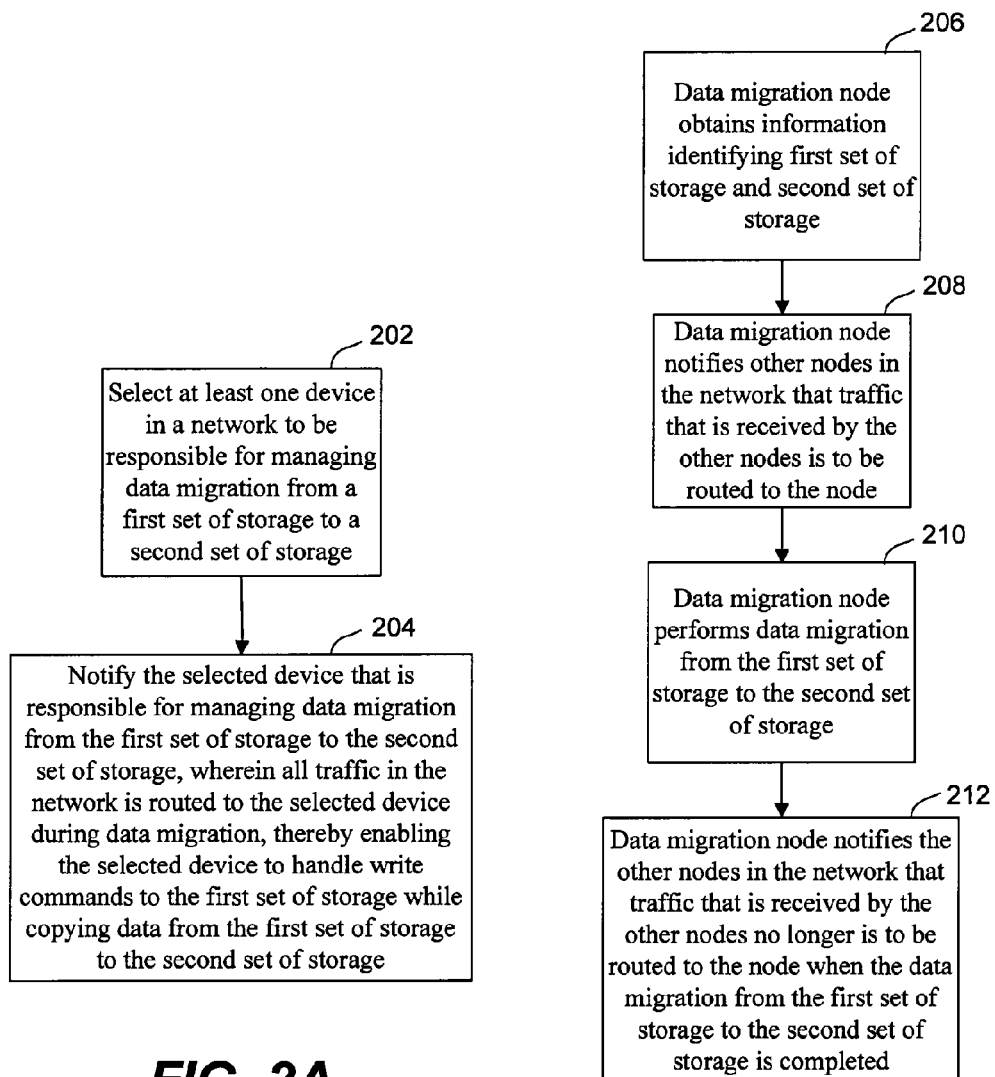
FIGS. 2A-2C are process flow diagrams that together illustrate an example general method of performing data migration in accordance with various embodiments.
Figure 2C:
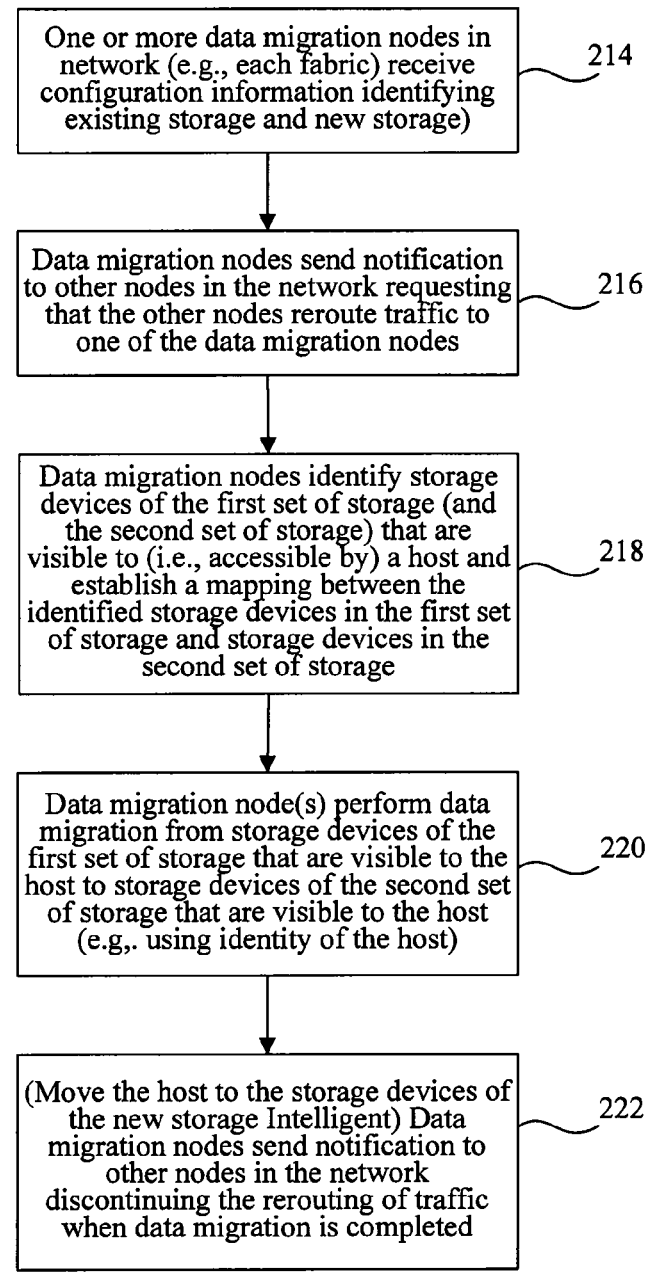

FIGS. 2A-2C are process flow diagrams that together illustrate an example general method of performing data migration in accordance with various embodiments. FIG. 2A is a process flow diagram illustrating a method that may be performed by an administrator via a configuration station that is initiating data migration. Specifically, the configuration station may select at least one device in a network to be responsible for managing data migration from a first set of storage devices to a second set of storage devices at 202. More specifically, if paths from the host to the first set of storage devices are spread across multiple fabrics, the configuration station may select a network device in each fabric to act as a data migration node for that fabric. A group of data migration nodes (e.g., across multiple fabrics) may be referred to as a data migration cluster.

The configuration station may then notify the selected device (i.e., data migration node) that it is responsible for managing data migration from the first storage to the second storage at 204, wherein all traffic in the network is routed to the selected device during data migration, thereby enabling the selected device to handle write (and read) commands to the first storage while copying data from the first storage to the second storage. The notification may explicit or implicit (e.g., by the sending of configuration information). Such notification may involve providing configuration information that identifies both sets of storage, as well as the host. Of course, steps 202 and 204 may be performed for each one of two or more networks, resulting in at least one selected device in each network.

In accordance with one embodiment, once a data migration node is notified of its responsibility for data migration, it may proceed with performing data migration. FIG. 2B is a process flow diagram illustrating an example general method of performing data migration by a data migration node. As set forth above, the data migration node may receive a notification indicating that the node has been selected as one of a set of data migration nodes to be responsible for data migration from the first storage to the second storage. In addition, the data migration node may obtain information identifying a first set of storage devices (e.g., LUNs) and a second set of storage devices (e.g., LUNs) at 206, as well as the host. For instance, the host may provide information identifying both sets of storage to each data migration node. Specifically, an Administrator may submit information via the configuration station that identifies ports of the first set of storage devices (the existing storage) and ports of the second set of storage devices (the new storage). This information may further identify ports of the host. The data migration node may then notify other nodes in the network that traffic that is received by the other nodes is to be routed to the data migration node at 208. The data migration node may then perform data migration from the first set of storage devices to the second set of storage devices at 210. When the data migration is completed, the data migration node may then notify the other nodes in the network that traffic that is received by the other nodes is no longer to be routed to the data migration node at 212.

FIG. 2C is a process flow diagram illustrating an example of a more detailed method of performing data migration by a data migration node. One or more data migration nodes in the network (e.g., each fabric) may receive configuration information identifying the first set of storage devices (e.g., existing storage) and the second set of storage devices (e.g., new storage) at 214. As set forth above, this configuration information may include ports of the first set of storage devices, ports of the second set of storage devices, and ports of the host.

The data migration node(s) may each send a notification to other nodes in the same network requesting that the other nodes reroute traffic to the requesting data migration node at 216. By rerouting traffic, a data migration node may receive all read and write commands directed to the existing storage. The network device sending a read or write command may be referred to as an initiator, while the network device to which the command is sent may be referred to as a target. For instance, a data migration node may establish itself as both a proxy initiator from the perspective of the target and a proxy target from the perspective of the host. More specifically, in a Fibre Channel network, the data migration node may establish a Fibre Channel Identifier (FCID) identifying the proxy initiator and a separate FCID identifying the proxy target. The data migration node may therefore provide the information (e.g., FCIDs) identifying the proxy initiator and proxy target to the other nodes, enabling the nodes to reroute the traffic to the proxy initiator or proxy target, as appropriate. Specifically, traffic may be rerouted by these nodes using a Fibre Channel Redirect feature, available from Cisco Systems, located at San Jose, California. As a result, a data migration node may intercept all inputs and outputs from the host to the first set of storage devices (e.g., LUNs) via the Fibre Channel Redirect Feature.

The data migration node may identify one or more storage devices (e.g., LUNs) of the first storage (and the second storage) that are visible to (i.e., accessible by) a host and establish a mapping between the identified storage devices in the first set of storage devices and one or more storage devices in the second set of storage devices 218. For example, each data migration node in the data migration node cluster may perform a SCSI device discovery on the storage ports of the first and second sets of storage devices using the identity of the host. A pair of host and storage ports (e.g., of the first or second set of storage devices) along which the host can access LUNs may be referred to as a path. Thus, each of the data migration nodes may perform the SCSI device discovery along every path in the corresponding node's local fabric. More specifically, using the identity of the host to perform the device discovery ensures that the data migration nodes discover the same LUNS seen by the host from each storage port. Thus, the data migration node may identify one or more storage devices in the second storage that are accessible by the host, and map the identified storage devices in the first storage to the identified storage devices in the second storage.

More specifically, the data migration node may map LUNs from the first set of storage devices to LUNs of the second set of storage devices.

The data migration node(s) may then perform data migration from the identified storage devices in the first set of storage devices to the corresponding mapped storage device(s) in the second set of storage devices. More specifically, the data migration node(s) may perform data migration from the storage devices of the first set of storage devices that are visible to the host to the storage devices of the second set of storage devices that are visible to the host (e.g,. using the identity of the host) at 220. In other words, the data migration proceeds as it would if the host itself were performing the data copy, even though the actual data migration processes are performed by the network (e.g., internal nodes of the network). Specifically, the data migration node may use the address (e.g., FCID) of the host as a source address of read or write commands that it transmits. Thus, those LUNs seen by the host on the existing storage ports are those migrated to the new storage. The ability to use the identity of the host to perform the data copy from the first set of storage devices to the second set of storage devices ensures that no LUN mapping or LUN masking changes need to be performed on the storage prior to data migration. The entire process of data migration in a single or multi fabric topology can be performed transparent to applications running on the host and may be performed while the applications continue to access data from the existing storage. Thus, there is no downtime, unlike prior art methods for performing data migration. The data migration nodes may then send a notification to other nodes in the network discontinuing the rerouting of traffic when data migration is completed at 222.

Figure 3:
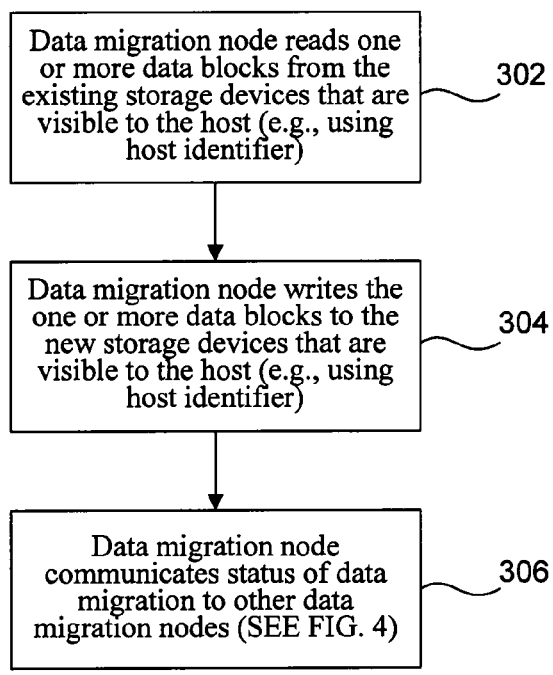
FIG. 3 is a process flow diagram illustrating an example method of migrating data from a first set of storage devices that are visible to the host to a second set of storage devices that are visible to the host as shown at 220 of FIG. 2C.

FIG. 3 is a process flow diagram illustrating an example method of migrating data from a first set of storage devices that are visible to the host to a second set of storage devices that are visible to the host as shown at 220 of FIG. 2C. A data migration node may read one or more data blocks from a first set of storage devices (e.g., existing storage) that are visible to the host at 302. More specifically, the data migration node may read one or more data blocks from the first set of storage devices using the identifier of the host. For example, the data migration node may read one or more data blocks from a LUN in the first set of storage devices, where the read command includes a source address equal to the FCID of the host.

The data migration node may then write the one or more data blocks to a second set of storage devices that are visible to the host (e.g., using the host identifier) at 304. More specifically, the data migration node may write the one or more data blocks to the second set of storage devices using the identifier of the host. For example, the data migration node may write the one or more data blocks that have been read to a particular LUN in the second set of storage devices, where the write command includes a source address equal to the FCID of the host.

The data migration node may communicate the status of the data migration to other data migration nodes during the data migration process at 306. As set forth above, the other data migration nodes in the data migration cluster may be in one or more other networks (e.g., SAN fabrics). Thus, the data migration node may communicate the status via the Internet Protocol or the Fibre Channel protocol to these other data migration nodes. In this manner, the data migration nodes in the data migration cluster may maintain the same status information. An example of such status information will be described in further detail with respect to FIG. 4.

Figure 4:
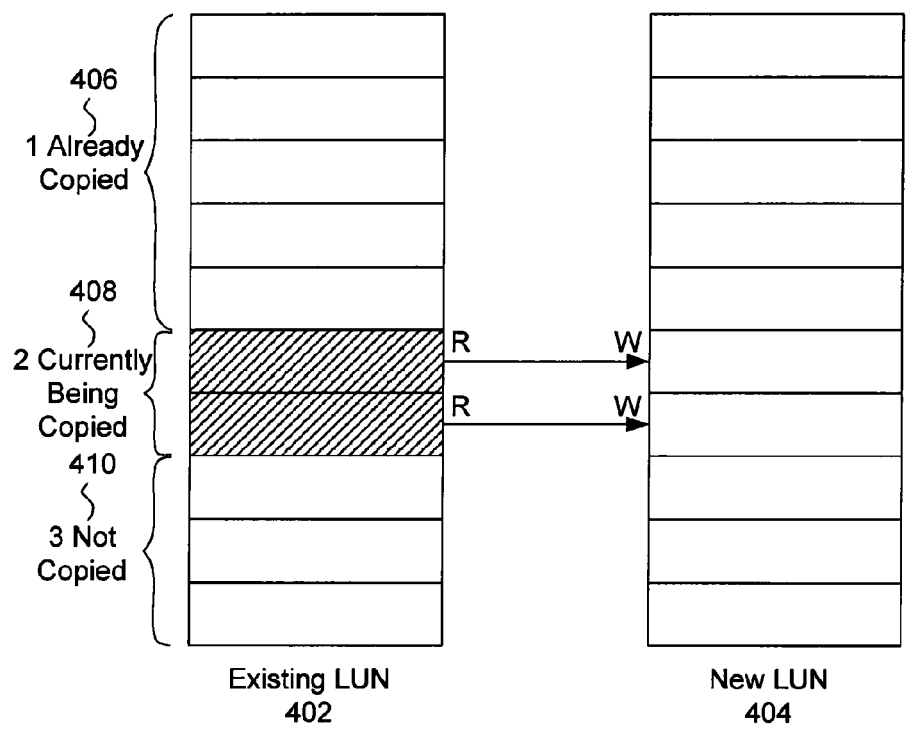
FIG. 4 is a diagram illustrating an example of information that may be maintained by intelligent nodes in accordance with various embodiments.

FIG. 4 is a diagram illustrating an example of information that may be maintained by data migration nodes in accordance with various embodiments. Each data migration node may maintain one or more data structures that indicate the status of the data migration process. More specifically, the information may indicate the status of data migration for each storage device in the first set of storage devices (e.g., existing storage). In this example, information maintained for a single storage device (e.g., LUN) in the first set of storage devices is shown at 402 in order to simplify the illustration. The information may also indicate a corresponding status for a storage device (e.g., LUN) in the second set of storage devices, as shown at 404. More specifically, the information may indicate a first set of data blocks 406 that have already been copied from the storage device in the first set of storage devices to the corresponding storage device in the second set of storage device, a second set of data blocks 408 of the storage device in the first set of storage devices that are currently being copied to the corresponding storage device in the second set of storage devices, and a third set of data blocks 410 of the storage device in the first set of storage devices that have not been copied to the corresponding storage device in the second set of storage devices. Through the use of this information, the data migration nodes may together manage data migration, as well as ensure that the integrity of the data is maintained during the data migration process.

Figure 5:
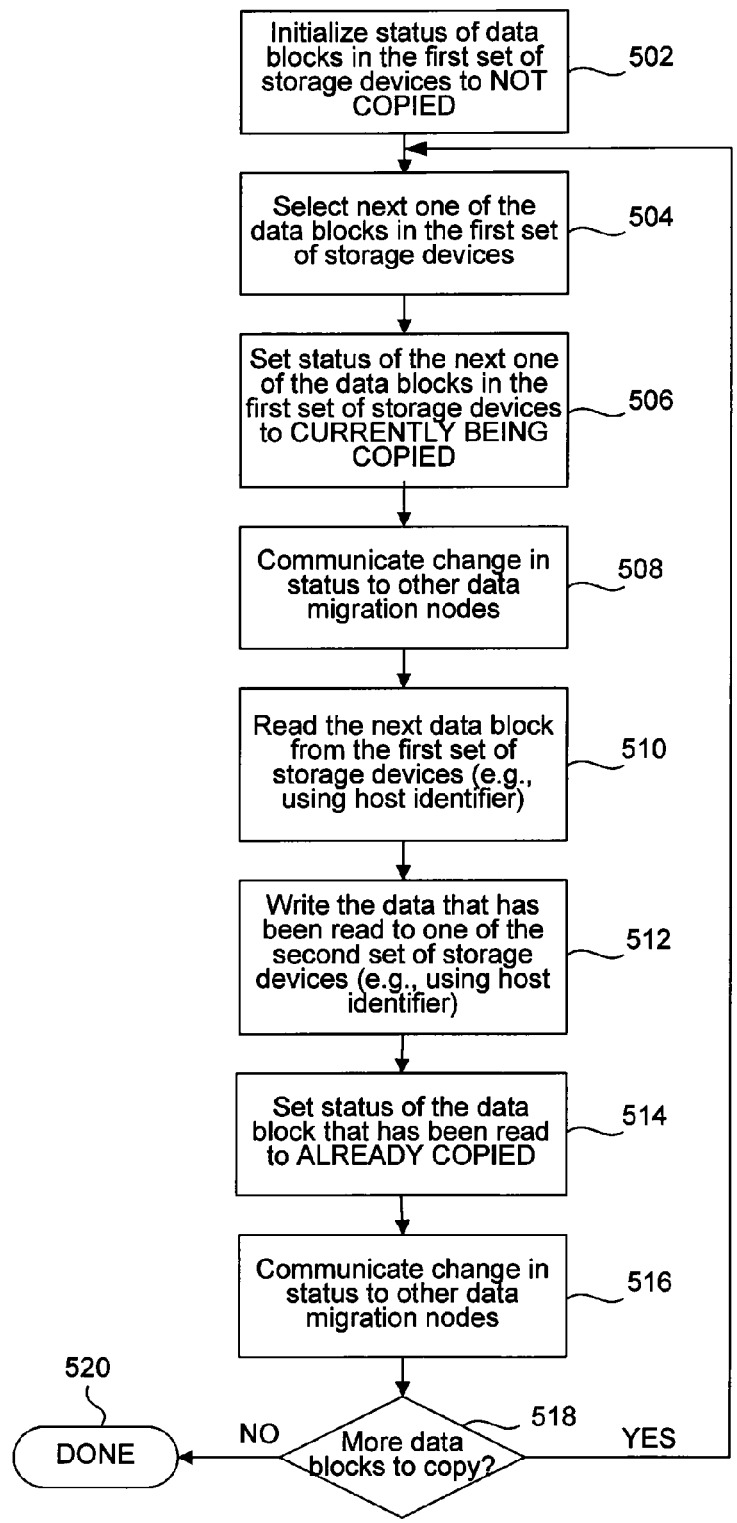
FIG. 5 is a process flow diagram illustrating an example method of migrating data while maintaining information such as that presented in FIG. 4.

FIG. 5 is a process flow diagram illustrating an example method of migrating data while maintaining information such as that presented in FIG. 4. A data migration node may initialize the status of data blocks in the first set of storage devices to NOT COPIED (i.e., not migrated) at 502. The data migration node may select a next one of the data blocks in the first set of storage devices at 504. The data migration node may set the status of the next one of the data blocks in the first set of storage devices to CURRENTLY BEING COPIED (i.e., in migration) at 506. The data migration node may communicate the change in status to other data migration nodes at 508. More specifically, the data migration node may notify the other data migration nodes that a specified set of one or more blocks in the first set of storage devices are currently being copied.

The data migration node may read the next data block from the first set of storage devices (e.g., using the host identifier) at 510 and write the data that has been read to one of the second set of storage devices at 512. The data migration node may set the status of the data block that has been read to ALREADY COPIED (i.e., already migrated) at 514. The data migration node may then communicate the change in status to other data migration nodes at 516. For example, the data migration node may notify the other data nodes that migration of a specified set of one or more blocks in the first set of storage devices is completed. The data migration node may determine whether there are more data blocks to copy at 518. If there are no more data blocks to copy, the process ends at 520. Otherwise, the data migration process continues at 514 for the remaining data blocks in the first set of storage devices. By communicating the status of the data migration process to the other data migration nodes, the data migration node may ensure that the data blocks that are being read and/or written are locked in order to ensure that the data is not corrupted by the other data migration nodes. However, alternative methods for locking the blocks of the LUNs may also be performed.

Figure 6:
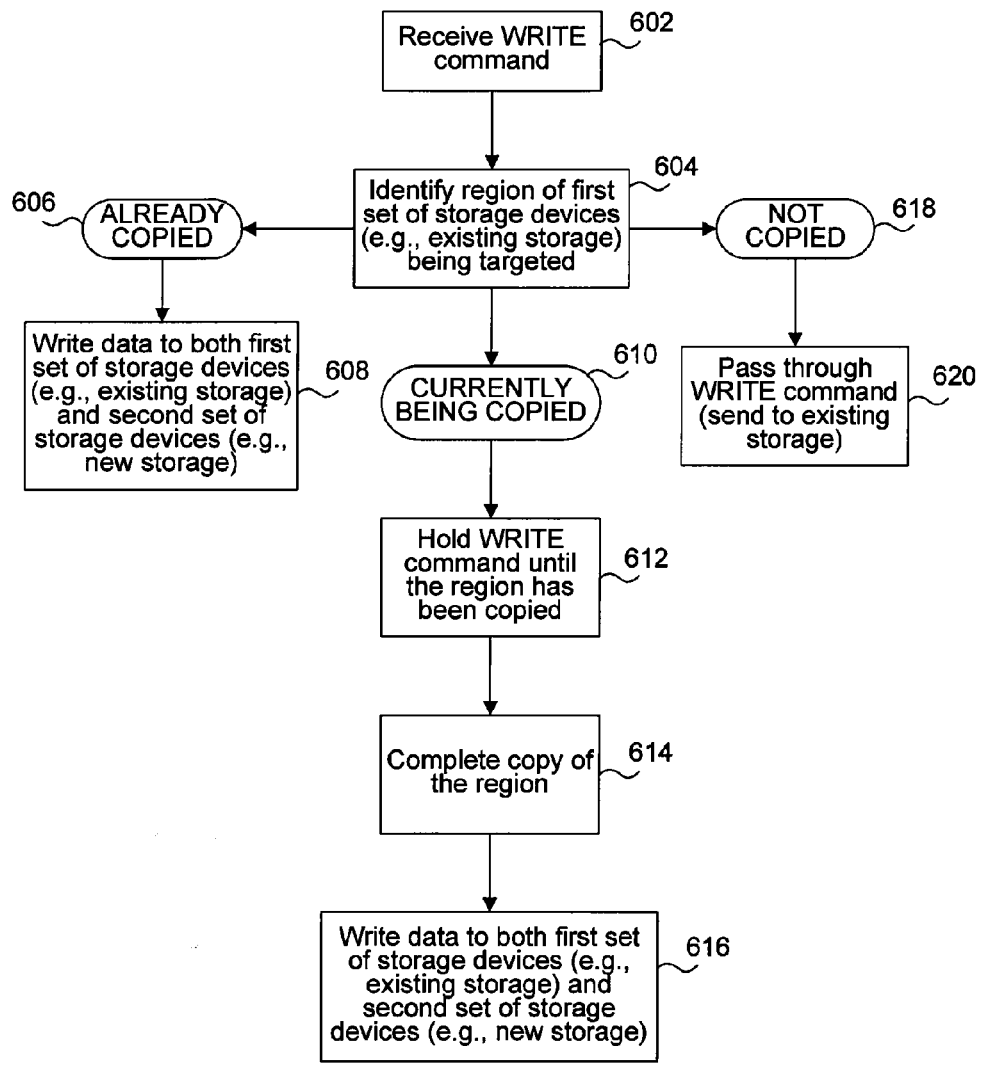
FIG. 6 is a process flow diagram illustrating an example method of processing a write command during data migration in accordance with various embodiments.

FIG. 6 is a process flow diagram illustrating an example method of processing a write command during data migration in accordance with various embodiments. When the data migration node receives a WRITE command at 602, it may identify the region of the first set of storage devices (e.g., existing storage) being targeted at 604. If the region being targeted has already been copied as shown at 606, the data migration node writes the data to both the first set of storage devices (e.g., existing storage) and the second set of storage devices (e.g., new storage) at 608. If the region being targeted is currently being copied as shown at 610, the data migration node may queue the WRITE command until the region has been copied at 612. Once the copy of the region has been completed at 614, the data migration node may write the data to both the first set of storage devices (e.g., existing storage) and the second set of storage devices (e.g., new storage) at 616. If the region has not been copied as shown at 618, the WRITE command may be sent only to the first set of storage devices (e.g., existing storage) at 620.

The disclosed embodiments enable a software application on a data migration node to perform data migration in the network. Data can be copied from the existing storage to new storage transparent to the applications that continue to run on the host (e.g., server), without requiring any rewiring or reconfiguration in the network, on the hosts, or the existing storage. Moreover, data migration can be accomplished while maintaining all paths from the host to a LUN including the paths across multiple fabrics in a SAN. Accordingly, data migration may be accomplished in a SAN without any disruption to the access from the host (e.g., server) to the existing storage.

A SAN administrator may insert the data migration service and perform data migration to new storage transparently without any downtime. Moreover, data migration can be enabled or disabled via software control in the SAN. Thus, the disclosed embodiments reduce dependencies on other Information Technology (IT) groups such as server administrators, database administrators, etc.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention may be implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. A general architecture for some of these machines will appear from the description given below. Further, various embodiments may be at least partially implemented on a card (e.g., an interface card) for a network device or a general-purpose computing device.

Figure 7:
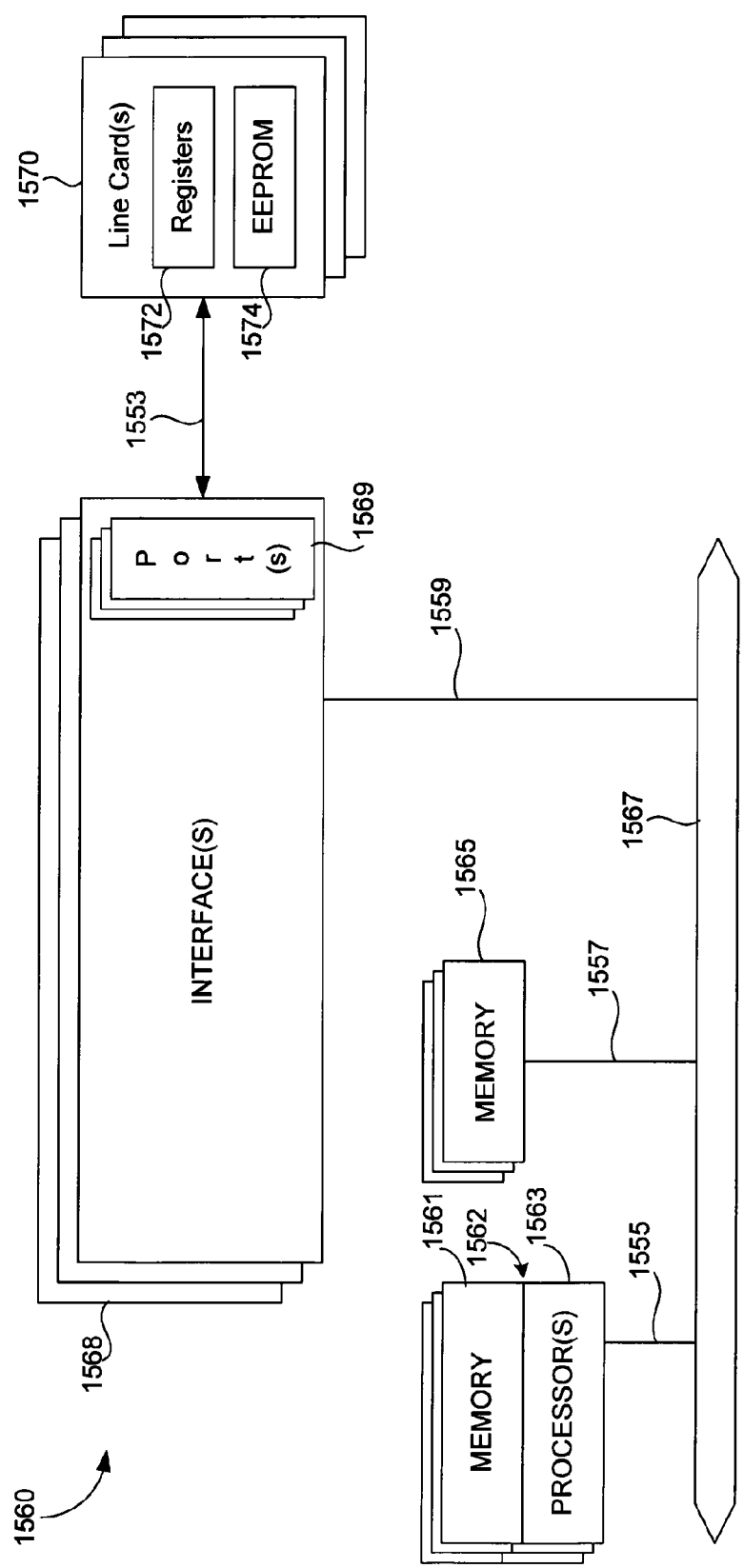
FIG. 7 is a diagrammatic representation of an example network device in which various embodiments may be implemented.

Each data migration node may be implemented at a network device such as a switch or router. Referring now to FIG. 7, a router or switch 710 suitable for implementing embodiments of the invention includes a master central processing unit (CPU) 762, interfaces 768, and a bus 715 (e.g., a PCI bus). When acting under the control of appropriate software or firmware, the CPU 762 is responsible for such router tasks as routing table computations and network management. It may also be responsible for implementing the disclosed embodiments, in whole or in part. The router may accomplish these functions under the control of software including an operating system (e.g., SANOS® or NX-OS® of Cisco Systems, Inc.) and any appropriate applications software. CPU 762 may include one or more processors 763 such as a processor from the Motorola family of microprocessors or the MIPS family of microprocessors. In an alternative embodiment, processor 763 is specially designed hardware for controlling the operations of router 10. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

The interfaces 768 are typically provided as interface cards (sometimes referred to as "line cards"). Generally, they control the sending and receiving of data packets or data segments over the network and sometimes support other peripherals used with the router 710. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, LAN interfaces, WAN interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc. Although the system shown in FIG. 7 is one specific router of the present invention, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 765) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The disclosed embodiments may also be embodied in a carrier wave traveling over an appropriate medium such as optical lines, electric lines, etc. Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the embodiments of the invention, and these variations would become clear to those of ordinary skill in the art after perusal of this application. For example, although various embodiments are described herein with reference to a single host, it is important to note that these embodiments are equally applicable to a system including multiple hosts. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method comprising:
transmitting a first notification to one or more network devices, the first notification indicating that a data migration node is selectively serving as one of a proxy initiator and a proxy target for traffic that is received by the one or more network devices during data migration between a first storage and a second storage;
determining that data migration between the first storage and the second storage is complete within a threshold; and
transmitting a second notification to the one or more network devices in response to determining that data migration is complete within the threshold, the second notification indicating that the data migration node is no longer selectively serving as one of the proxy initiator and the proxy target.

2. The method of claim 1, further comprising receiving an indicator that the data migration node is responsible for managing data migration from the first storage to the second storage.

3. The method of claim 1, further comprising receiving respective identifiers for the first storage and the second storage.

4. The method of claim 1, wherein the data migration node selectively serving as one of the proxy initiator and the proxy target includes the data migration node receiving traffic that is received by the one or more network devices.

5. The method of claim 1, further comprising performing data migration from the first storage to the second storage in response to transmitting the first notification.

6. The method of claim 1, further comprising communicating a status of the data migration to one or more other data migration nodes responsible for managing data migration, wherein the data migration node is an internal node of the network, and wherein the one or more other data migration nodes responsible for data migration are in one or more other fabrics.

7. The method of claim 1, further comprising identifying one or more storage devices in the first storage that are accessible by a host.

8. The method of claim 7, further comprising: mapping the one or more storage devices in the first storage that are accessible by the host to one or more storage devices in the second storage, wherein performing data migration from the first storage to the second storage includes copying data from the one or more storage devices in the first storage to the one or more storage devices in the second storage.

9. The method of claim 8, wherein copying the data from the one or more storage devices in the first storage to the one or more storage devices in the second storage is performed using an identifier of the host.

10. The method of claim 7, further comprising:
identifying one or more storage devices in the second storage that are accessible by the host; and
mapping the one or more storage devices in the first storage to the one or more storage devices in the second storage, wherein performing data migration from the first storage to the second storage includes copying data from the one or more storage devices in the first storage to the one or more storage devices in the second storage, wherein copying is performed using an identifier of the host.

11. The method of claim 1, further comprising:
mapping one or more storage devices in the first storage that are accessible to a host to one or more storage devices in the second storage, wherein performing data migration from the first storage to the second storage includes copying data by the data migration node from the one or more storage devices in the first storage to the one or more storage devices in the second storage, wherein copying is performed using an identifier of the host.

12. The method of claim 1, wherein communicating the status of the data migration to one or more other data migration nodes responsible for managing data migration comprises notifying the one or more other data migration nodes responsible for managing data migration that a specified set of one or more blocks in the first storage are currently being copied.

13. The method of claim 1, wherein communicating the status of the data migration to the one or more other data migration nodes responsible for managing data migration comprises notifying the one or more other data migration nodes responsible for managing data migration that migration of a specified set of one or more blocks in the first storage is completed.

14. The method of claim 1, wherein network traffic is routed to the data migration node during data migration, thereby enabling the data migration node to handle write commands to the first set of storage while copying data from the first set of storage to the second set of storage.

15. The method of claim 1, wherein the data migration node is a switch or router that is internal to the network.

16. An apparatus, comprising:
a processor; a non-transitory memory including instructions, that when executed by the processor, cause the apparatus to:
transmit a first notification to one or more network devices, the first notification indicating that a data migration node is selectively serving as one of a proxy initiator and a proxy target for traffic that is received by the one or more network devices during data migration between a first storage and a second storage;
determine that data migration between the first storage and the second storage is complete within a threshold; and
transmit a second notification to the one or more network devices in response to determining that data migration is complete within the threshold, the second notification indicating that the data migration node is no longer selectively serving as one of the proxy initiator and the proxy target.

17. The apparatus of claim 16, wherein the data migration node selectively serving as one of the proxy initiator and the proxy target includes the data migration node receiving traffic that is received by the one or more network devices.

18. The apparatus of claim 16, wherein the non-transitory memory also includes instructions, that when executed by the processor, cause the apparatus to communicate a status of the data migration to one or more other data migration nodes responsible for managing data migration, wherein the data migration node is an internal node of the network, and wherein the one or more other data migration nodes responsible for data migration are in one or more other fabrics.

19. The apparatus of claim 16, wherein the non-transitory memory also includes instructions, that when executed by the processor, cause the apparatus to communicate the status of the data migration to the one or more other data migration nodes responsible for managing data migration comprises notifying the one or more other data migration nodes responsible for managing data migration that migration of a specified set of one or more blocks in the first storage is completed.

20. The apparatus of claim 16, wherein network traffic is routed to the data migration node during data migration, thereby enabling the data migration node to handle write commands to the first set of storage while copying data from the first set of storage to the second set of storage.

* * * * *